United States Patent
Hahn et al.

(10) Patent No.: US 12,132,571 B2
(45) Date of Patent: Oct. 29, 2024

(54) METHOD AND APPARATUS FOR TRANSMITTING AND RECEIVING HYBRID AUTOMATIC REPEAT REQUEST (HARQ) RESPONSE IN SIDELINK COMMUNICATION

(71) Applicants: Hyundai Motor Company, Seoul (KR); Kia Corporation, Seoul (KR); Wonkwang University Center For Industry-Academy Cooperation, Jeollabuk-do (KR)

(72) Inventors: Gene Back Hahn, Gyeonggi-do (KR); Hyuk Min Son, Jeollabuk-do (KR)

(73) Assignees: Hyundai Motor Company, Seoul (KR); Kia Corporation, Seoul (KR); Wonkwang University Center for Industry-Academy Cooperation, Jeollabuk-do (KR)

( * ) Notice: Subject to any disclaimer, the term of this patent is extended or adjusted under 35 U.S.C. 154(b) by 519 days.

(21) Appl. No.: 17/416,824

(22) PCT Filed: Apr. 12, 2021

(86) PCT No.: PCT/KR2021/004595
§ 371 (c)(1),
(2) Date: Jun. 21, 2021

(87) PCT Pub. No.: WO2021/210870
PCT Pub. Date: Oct. 21, 2021

(65) Prior Publication Data
US 2023/0261797 A1   Aug. 17, 2023

Related U.S. Application Data

(60) Provisional application No. 63/008,868, filed on Apr. 13, 2020.

(51) Int. Cl.
*H04L 1/1607* (2023.01)
*H04L 1/1812* (2023.01)

(52) U.S. Cl.
CPC .......... *H04L 1/1678* (2013.01); *H04L 1/1819* (2013.01)

(58) Field of Classification Search
CPC ........................... H04L 1/1819; H04L 1/1678
(Continued)

(56) References Cited

U.S. PATENT DOCUMENTS 10,993,141 B2 * 4/2021 Huang .................. H04L 1/1812
11,444,729 B2 * 9/2022 Yeo ...................... H04W 52/367
(Continued)

OTHER PUBLICATIONS

Lien et al., 3GPP NR Sidelink Transmissions Toward 5G V2X, Dec. 17, 2019, IEEE, vol. 8 2020, 15 pages (Year: 2019).*
(Continued)

*Primary Examiner* — Mong-Thuy T Tran
(74) *Attorney, Agent, or Firm* — Fox Rothschild LLP

(57) ABSTRACT

A method and an apparatus for transmitting and receiving HARQ response in sidelink communication are provided. The operation method of a first terminal includes receiving DCI for scheduling sidelink transmission from a base station and transmitting first sidelink data to a second terminal based on the DCI. A first SL HARQ response is received for the first sidelink data from the second terminal via a PSFCH. The first SL HARQ response is transmitted to the base station via a PUCCH at a feedback timing indicated by first information included in the DCI.

10 Claims, 7 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 11,653,355 | B2* | 5/2023 | Ko | H04L 1/1812 |
| | | | | 370/329 |
| 11,824,811 | B2* | 11/2023 | Lei | H04L 5/0055 |
| 11,838,132 | B2* | 12/2023 | Yeo | H04L 1/1812 |
| 2019/0052416 | A1* | 2/2019 | Babaei | H04W 76/28 |
| 2020/0106566 | A1 | 4/2020 | Yeo et al. | |
| 2020/0266857 | A1* | 8/2020 | Hwang | H04W 72/23 |
| 2020/0351866 | A1* | 11/2020 | Park | H04L 1/1864 |
| 2021/0045100 | A1* | 2/2021 | Park | H04L 1/1854 |
| 2021/0050953 | A1* | 2/2021 | Park | H04B 7/0456 |
| 2022/0053521 | A1* | 2/2022 | Yoshioka | H04L 1/1896 |
| 2022/0174648 | A1* | 6/2022 | Dong | H04L 5/0005 |
| 2022/0209899 | A1* | 6/2022 | Lee | H04L 1/1896 |
| 2022/0217766 | A1* | 7/2022 | Lee | H04L 1/1861 |
| 2022/0217768 | A1* | 7/2022 | Liu | H04L 5/0094 |
| 2022/0264530 | A1* | 8/2022 | Elshafie | H04L 5/0057 |
| 2022/0321191 | A1* | 10/2022 | Kim | H04L 1/1864 |
| 2022/0346118 | A1* | 10/2022 | Wu | H04L 1/1825 |
| 2023/0037912 | A1* | 2/2023 | Lee | H04L 1/1835 |
| 2023/0045750 | A1* | 2/2023 | Ko | H04L 5/0033 |

OTHER PUBLICATIONS

"Considerations on Sidelink HARQ Procedure", 3GPP TSG RAN WG1 #96, Athens, Greece, Feb. 25-Mar. 1, 2019, Agenda Item 7.2.4.1.5, R1-1902278, 11 pages.

"Uu-based sidelink resource allocation", 3GPP TSG-RAN WG1 Meeting #99, Reno, NV, US 18th-22nd 2019, Agenda Item: 7.2.4.2.1, R1-1912598, 24 pages.

* cited by examiner

METHOD AND APPARATUS FOR TRANSMITTING AND RECEIVING HYBRID AUTOMATIC REPEAT REQUEST (HARQ) RESPONSE IN SIDELINK COMMUNICATION

CROSS-REFERENCE TO RELATED APPLICATIONS

This application is a National Phase application filed under 35 USC 371 of PCT International Application No. PCT/KR2021/004595 with an International Filing Date of Apr. 12, 2021, which claims the benefit of U.S. Provisional Application 63/008,868 filed on Apr. 13, 2020. The entire contents of these applications are incorporated herein by reference in their entirety.

TECHNICAL FIELD

The present disclosure relates to a sidelink communication technique, and more specifically, to a technique of reporting sidelink (SL) hybrid automatic repeat request (HARQ) response.

BACKGROUND ART

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. The sidelink communication may be performed using configured grant (CG) resources. The CG resources may be configured periodically, and periodic data (e.g., periodic sidelink data) may be transmitted using the CG resources.

Meanwhile, a sidelink (SL) hybrid automatic repeat request (HARQ) response for sidelink data may be transmitted to the base station through an uplink channel. The sidelink data may not be transmitted according to a priority, and in this case, a negative acknowledgment (NACK) may be transmitted to the base station as the SL HARQ response for the sidelink data. When the NACK for the sidelink data is received, the base station may transmit control information including information element(s) for retransmission of the sidelink data to the terminal. Since the information element(s) received from the base station may be different from information element(s) to be used by the terminal for transmission of the sidelink data, the transmission of the sidelink data may not be performed accurately. Therefore, methods to solve this problem may be needed.

SUMMARY

An objective of the present disclosure for solving the above-described problem is to provide a method and an apparatus for transmitting and receiving a hybrid automatic repeat request (HARQ) response in sidelink communication.

An operation method of a first terminal, according to a first exemplary embodiment of the present disclosure for achieving the objective, may include: receiving DCI for scheduling sidelink transmission from a base station; transmitting first sidelink data to a second terminal based on the DCI; receiving a first SL HARQ response for the first sidelink data from the second terminal through a PSFCH; and transmitting the first SL HARQ response to the base station via a PUCCH at a feedback timing indicated by first information included in the DCI.

In particular, the operation method of the first terminal may further include receiving a higher layer message including information indicating one or more feedback timings from the base station, wherein the first information included in the DCI may indicate one among the one or more feedback timings. The feedback timing may indicate a time gap between the PSFCH and the PUCCH. The DCI may further include resource allocation information for the first sidelink data, and the first sidelink data may be transmitted on a PSSCH indicated by the resource allocation information.

The operation method of the first terminal may further include transmitting sidelink control information (SCI) including resource allocation information for the first sidelink data to the second terminal, wherein the first sidelink data may be transmitted on a PSSCH indicated by the resource allocation information. The SCI may further include an RV, and the RV may be determined based on a preconfigured mapping relationship. The transmitting of the first SL HARQ response to the base station may include: generating a HARQ-ACK codebook including a DL HARQ response for downlink data received from the base station and the first SL HARQ response; and transmitting the HARQ-ACK codebook to the base station via the PUCCH. The operation method of the first terminal may further include: transmitting second sidelink data to the second terminal; and receiving a second SL HARQ response for the second sidelink data from the second terminal, wherein the second SL HARQ response may be transmitted to the base station together with the first SL HARQ response through the PUCCH.

An operation method of a base station, according to a second exemplary embodiment of the present disclosure for achieving the objective, may include: generating DCI including resource allocation information of sidelink data and first information indicating a feedback timing of a SL HARQ response for the sidelink data; transmitting the DCI to a first terminal via a PDCCH; and receiving the SL HARQ response from the first terminal via a PUCCH at the feedback timing, wherein the SL HARQ response may be generated by a second terminal receiving the sidelink data from the first terminal.

The operation method of the first terminal may further include transmitting a higher layer message including information indicating one or more feedback timings, wherein the first information included in the DCI may indicate one among the one or more feedback timings. The feedback timing may indicate a time gap between a PSFCH and the PUCCH. In particular, the SL HARQ response may be received together with a DL HARQ response for downlink data transmitted from the base station to the first terminal.

An operation method of a first terminal, according to a third exemplary embodiment of the present disclosure for achieving the objective, may include: a processor; and a memory configured to store at least one instruction executed by the processor, wherein the at least one instruction may be executed to: receive DCI for scheduling sidelink transmission from a base station; transmit first sidelink data to a second terminal based on the DCI; receive a first SL HARQ response for the first sidelink data from the second terminal via a PSFCH; and transmit the first SL HARQ response to the base station via a PUCCH at a feedback timing indicated by first information included in the DCI.

In particular, the at least one instruction may be further executed to receive a higher layer message including information indicating one or more feedback timings from the base station, wherein the first information included in the DCI may indicate one among the one or more feedback timings. The feedback timing may indicate a time gap between the PSFCH and the PUCCH. The DCI further may include resource allocation information for the first sidelink data, and the first sidelink data may be transmitted on a PSSCH indicated by the resource allocation information.

The at least one instruction may be further executed to transmit sidelink control information (SCI) including resource allocation information for the first sidelink data to the second terminal, wherein the first sidelink data may be transmitted on a PSSCH indicated by the resource allocation information. The SCI may further include an RV, and the RV may be determined based on a preconfigured mapping relationship. The at least one instruction may be further executed to, in the transmitting of the first SL HARQ response to the base station, generate a HARQ-ACK codebook including a DL HARQ response for downlink data received from the base station and the first SL HARQ response; and transmit the HARQ-ACK codebook to the base station through the PUCCH.

The at least one instruction may be further executed to: transmit second sidelink data to the second terminal; and receive a second SL HARQ response for the second sidelink data from the second terminal, wherein the second SL HARQ response may be transmitted to the base station together with the first SL HARQ response via the PUCCH.

According to the exemplary embodiments of the present disclosure, a transmitting terminal may receive DCI including information element(s) required for sidelink communication from a base station. When the information element(s) included in the DCI are different from information element(s) to be used for current sidelink communication, the transmitting terminal may reconfigure the information element(s) according to a preconfigured rule, and may perform sidelink communication with a receiving terminal by using the reconfigured information element(s). Accordingly, the sidelink communication may be performed efficiently, and the performance of the communication system may be improved.

DETAILED DESCRIPTION

Figure 1:
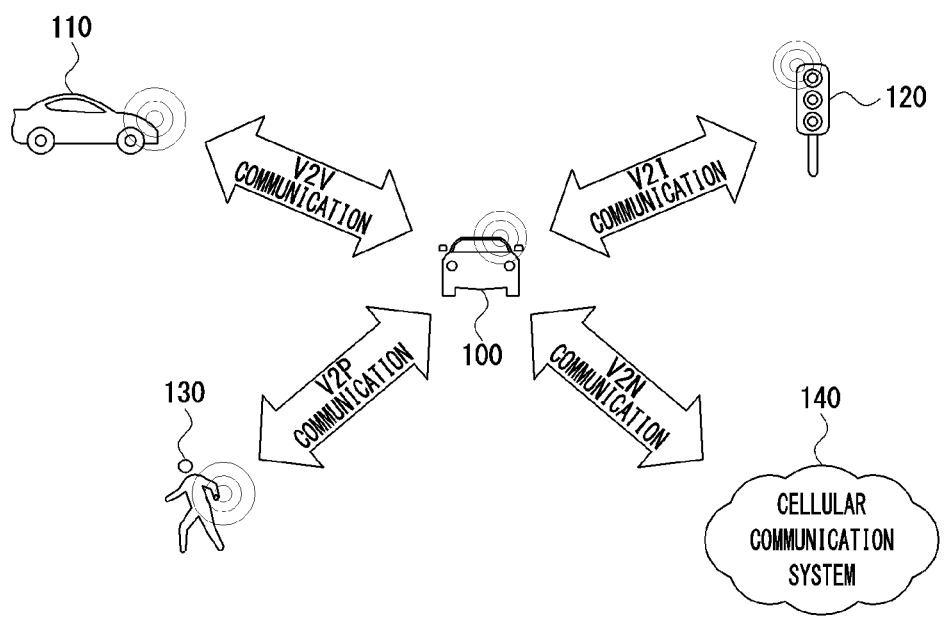
FIG. 1 is a conceptual diagram illustrating V2X communication scenarios.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present invention will be described in detail with reference to the accompanying drawings. In describing the present invention, to facilitate the entire understanding, like numbers refer to like elements throughout the description of the figures and the repetitive description thereof will be omitted.

FIG. 1 is a conceptual diagram illustrating V2X communication scenarios. As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." The cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 via the V2V communications. For example, autonomous driving (e.g., platooning) may be supported based on the driving information exchanged using the V2V communications. The V2V communications supported in the cellular communication system 140 may be performed based on "sidelink" communication technologies (e.g., ProSe and D2D communication technologies, and the like). In particular, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 via the V2I communications. The V2I communications supported in the cellular communication system 140 may also be performed based on sidelink communication technologies (e.g., ProSe and D2D communication technologies, and the like). In particular, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 via the V2P communications. The communication node located in the vehicle 100 or the communication node carried by the person 130 may generate an alarm indicating a danger by determining a dangerous situation based on the obtained driving information and movement information. The V2P communications supported in the cellular communication system 140 may be performed based on sidelink communication technologies (e.g., ProSe and D2D communication technologies, and the like). In particular, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected via the cellular communication system 140. The V2N communications may be performed based on the 4G communication technology (e.g., LTE or LTE-A) or the 5G communication technology (e.g., NR). Additionally, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
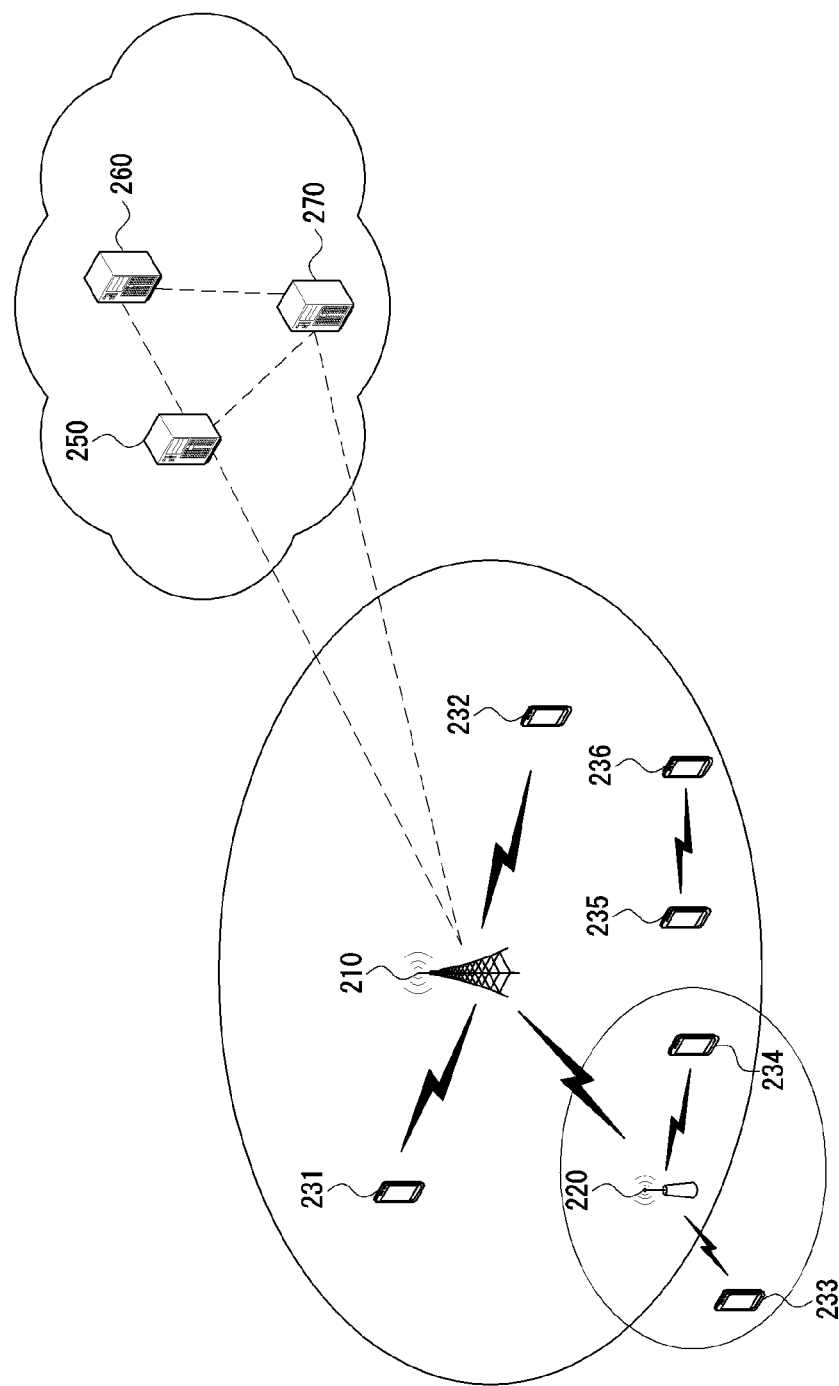
FIG. 2 is a conceptual diagram illustrating an exemplary embodiment of a cellular communication system.

FIG. 2 is a conceptual diagram illustrating an exemplary embodiment of a cellular communication system. As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

Additionally, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported by the V2X network slice configured in the core network.

The communication nodes (e.g., base station, relay, UE, S-GW, P-GW, MME, UPF, SMF, AMF, etc.) comprising the cellular communication system may perform communications using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multicarrier (FBMC) technology, a universal filtered multi-carrier (UFMC) technology, and a space division multiple access (SDMA) technology. The communication nodes (e.g., base station, relay, UE, S-GW, P-GW, MME, UPF, SMF, AMF, etc.) comprising the cellular communication system may be configured as follows.

Figure 3:
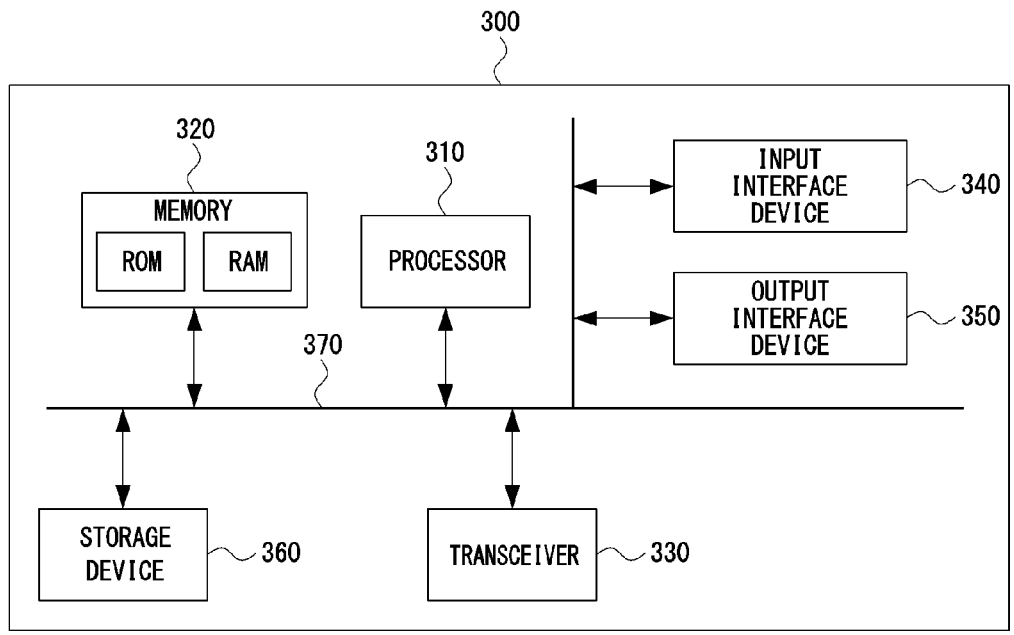
FIG. 3 is a conceptual diagram illustrating an exemplary embodiment of a communication node constituting a cellular communication system.

FIG. 3 is a conceptual diagram illustrating an exemplary embodiment of a communication node constituting a cellular communication system. As shown in FIG. 3, a communication node 300 may include at least one processor 310, a memory 320, and a transceiver 330 connected to a network for performing communications. Additionally, the communication node 300 may further include an input interface device 340, an output interface device 350, a storage device 360, and the like. Each component included in the communication node 300 may communicate with each other as connected via a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may include at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. In other words, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. In other words, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Particularly, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
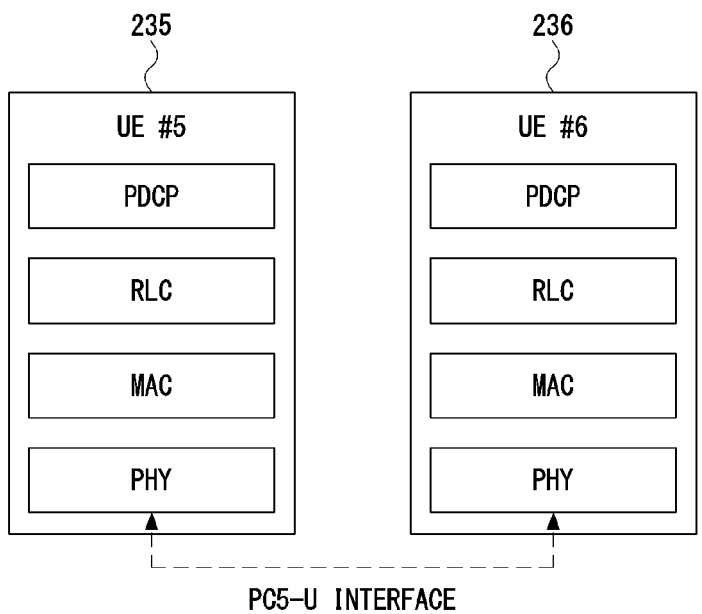
FIG. 4 is a block diagram illustrating an exemplary embodiment of a user plane protocol stack of a UE performing sidelink communication.

FIG. 4 is a block diagram illustrating an exemplary embodiment of a user plane protocol stack of a UE performing sidelink communication. As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may include a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Additionally, in the sidelink communications, a hybrid automatic repeat request (HARQ) feedback operation may be supported, and an RLC acknowledged mode (RLC AM) or an RLC unacknowledged mode (RLC UM) may be supported. Meanwhile, a control plane protocol stack of the UEs (e.g., the UEs 235 and 236) performing sidelink communications may be configured as follows.

Figure 5:
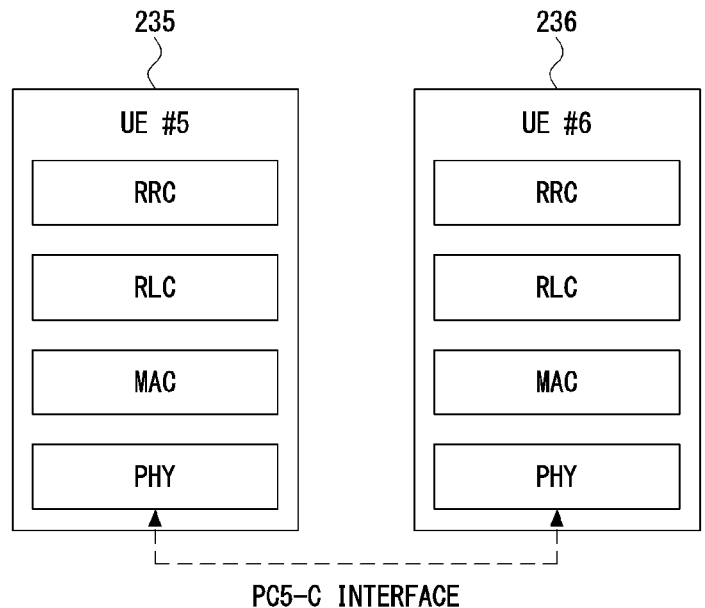
FIG. 5 is a block diagram illustrating a first exemplary embodiment of a control plane protocol stack of a UE performing sidelink communication.
Figure 6:
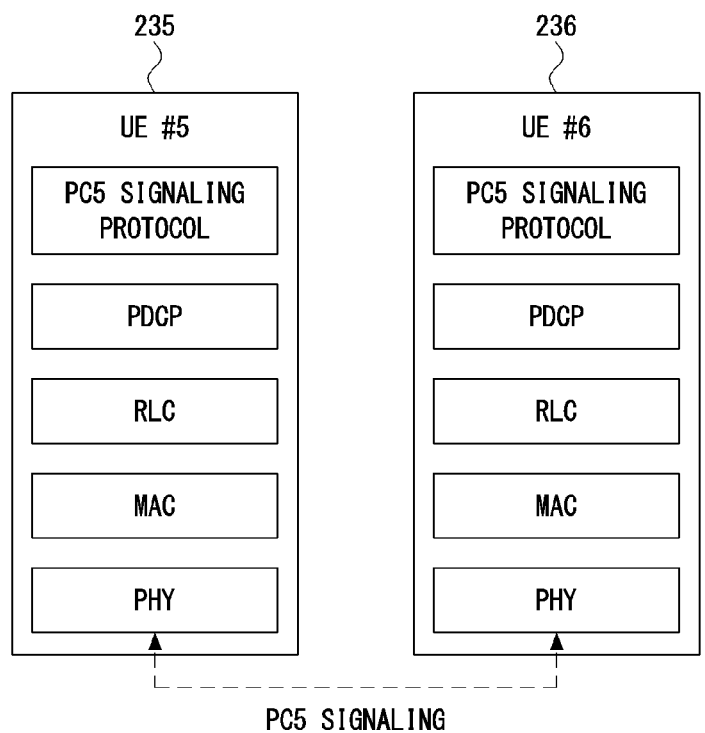
FIG. 6 is a block diagram illustrating a second exemplary embodiment of a control plane protocol stack of a UE performing sidelink communication.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication. As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). In addition, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In particular, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In particular, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. Particularly, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. The sidelink data may be transmitted and received through resources selected autonomously by the UE (e.g., UE 235 or 236) within the resource pool configured by the dedicated RRC signaling procedure or the broadcast RRC signaling procedure.

Hereinafter, methods for retransmitting sidelink data will be described. In the exemplary embodiments, a HARQ response may be referred to as 'HARQ-acknowledgement (HARQ-ACK)'. The HARQ response may be ACK or negative ACK (NACK). A downlink (DL) HARQ response may be a HARQ response for downlink data, an uplink (UL) HARQ response may be a HARQ response for uplink data, and a sidelink (SL) HARQ response may be a HARQ response for sidelink data.

Even when a method (e.g., transmission or reception of a signal) to be performed at a first communication node among communication nodes is described, a corresponding second communication node may perform a method (e.g., reception or transmission of the signal) corresponding to the method performed at the first communication node. In other words, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments, signaling may be one or a combination of two or more of higher layer signaling, MAC signaling, and physical (PHY) signaling. A message used for the higher layer signaling may be referred to as a 'higher layer message' or a 'higher layer signaling message'. A message used for the MAC signaling may be referred to as a 'MAC message' or a 'MAC signaling message'. A message used for the PHY signaling may be referred to as a 'PHY message' or a 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

The sidelink communication may be performed based on a single SCI scheme or a multi SCI scheme. When the single SCI scheme is used, data transmission (e.g., sidelink data transmission, sidelink-shared channel (SL-SCH) transmission) may be performed based on a single SCI (e.g., 1st-stage SCI). When the multi SCI scheme is used, data transmission may be performed using two SCIs (e.g., 1st-stage SCI and 2nd-stage SCI). The SCI may be transmitted via a PSCCH and/or a PSSCH. When the single SCI scheme is used, the SCI (e.g., 1st-stage SCI) may be transmitted via a PSCCH. When the multi SCI scheme is used, the 1st-stage SCI may be transmitted via a PSCCH, and the 2nd-stage SCI may be transmitted through a PSCCH or a PSSCH. The 1st-stage SCI may be referred to as a 'first stage SCI', and the 2nd-stage SCI may be referred to as a 'second stage SCI'.

The 1st-stage SCI may include one or more information elements among priority information, frequency resource assignment information, time resource assignment information, resource reservation period information, DMRS pattern information, 2nd-stage SCI format information, beta offset indicator, number of DMRS ports, and modulation and coding scheme (MCS) information. The 2nd-stage SCI may include one or more information elements among a HARQ process identifier (ID), redundancy version (RV), source ID, destination ID, CSI request information, zone ID, and communication range requirement.

Figure 7:
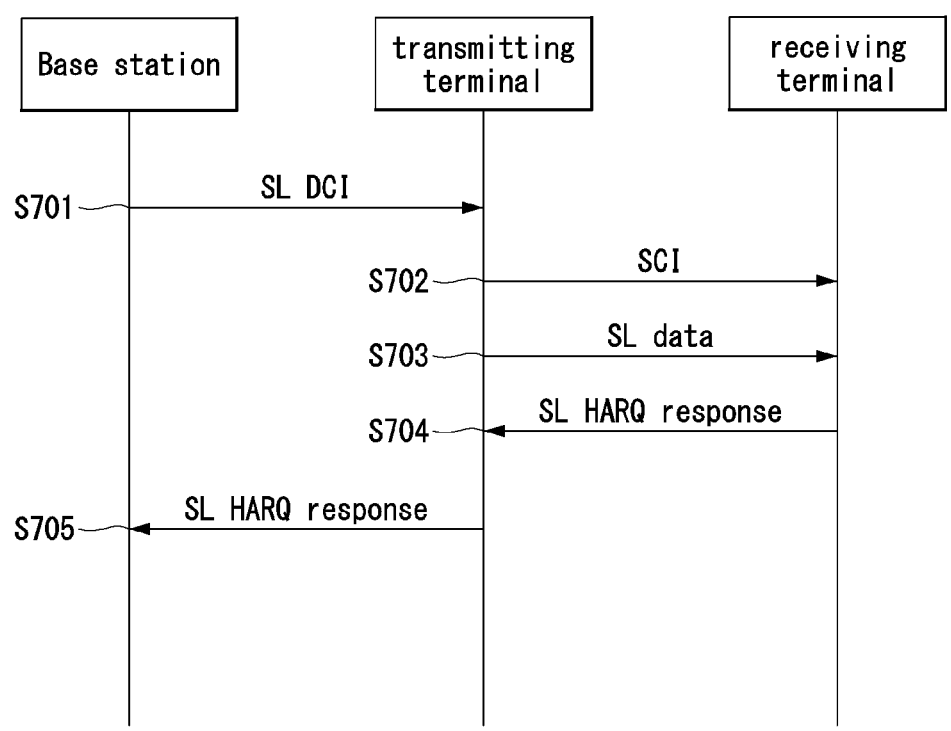
FIG. 7 is a sequence chart illustrating a first exemplary embodiment of a sidelink communication method in a communication system.

FIG. 7 is a sequence chart illustrating a first exemplary embodiment of a sidelink communication method in a communication system. As shown in FIG. 7, a communication system may include a base station, a transmitting terminal (e.g., first terminal), and a receiving terminal (e.g., second terminal). The base station may be the base station 210 shown in FIG. 2, the transmitting terminal may be UE #5 235 shown in FIG. 2, and the receiving terminal may be UE #6 236 shown in FIG. 2. Each of the base station, transmitting terminal, and receiving terminal may be configured identically or similarly to the communication node 300 shown in FIG. 3. The transmitting node and the receiving node may support the protocol stacks shown in FIGS. 4 to 6.

The base station may generate downlink control information (DCI) for sidelink scheduling, and transmit the DCI via a physical downlink control channel (PDCCH) (S701). The DCI for sidelink scheduling may be referred to as "SL DCI". The SL DCI may have a DCI format 3_0 or DCI format 3_1. The SL DCI may include a resource pool index, time gap, HARQ process number, redundancy version (RV), new data indicator (NDI), the lowest index of a subchannel allocated for initial transmission, SCI format 1-A fields (e.g., frequency resource assignment, time resource assignment), PSFCH-to-HARQ feedback timing indicator, PUCCH resource indicator, configuration index, counter sidelink assignment index, and/or padding bit(s). The frequency resource assignment and time resource assignment included in the SL DCI may indicate a resource used for sidelink communication (e.g., SCI transmission and/or SL data transmission).

The transmitting terminal may receive the SL DCI from the base station, and may identify the information element(s) included in the SL DCI. The transmitting terminal may perform sidelink communication based on the information element(s) included in the SL DCI. In addition, the receiving terminal may also receive the SL DCI from the base station.

The transmitting terminal may generate SCI based on the information element(s) included in the SL DCI, and transmit the SCI to the receiving terminal (S702). The SCI may be transmitted on a PSCCH and/or PSSCH. The SCI may have one or more formats among a SCI format 1-A, SCI format 2-A, and SCI format 2-B. The transmitting terminal may transmit SL data to the receiving terminal by using a resource indicated by the SCI (S703). The receiving terminal may receive the SCI from the transmitting terminal, and may receive the SL data from the transmitting terminal in the resource indicated by the SCI. The sidelink communication procedure between the transmitting terminal and the receiving terminal may be performed without SCI. When the SL DCI includes resource allocation information (e.g., frequency resource assignment, time resource assignment) for sidelink communication, the sidelink communication procedure between the transmitting terminal and the receiving terminal may be performed based on the SL DCI instead of SCI. In other words, transmission of SL data (e.g., PSSCH transmission) may be scheduled by the SL DCI.

The receiving terminal may generate a SL HARQ response for the SL data and may transmit the SL HARQ response to the transmitting terminal (S704). The SL HARQ response may be transmitted on a PSFCH. The transmitting terminal may receive the SL HARQ response from the receiving terminal. The transmitting terminal may report the SL HARQ response to the base station using a resource (e.g., physical uplink control channel (PUCCH), physical uplink shared channel (PUSCH)) indicated by the information element included in the SL DCI (S705). The base station may receive the SL HARQ response from the transmitting terminal, and may identify a reception state of the SL data based on the SL HARQ response.

Meanwhile, in a specific situation (e.g., when SL data has a low priority), the transmitting terminal may not be able to transmit the SL data (e.g., PSSCH) scheduled by the SL DCI. In particular, the transmitting terminal may report a NACK to the base station. In addition, when SCI is not transmitted according to the SL DCI, the transmitting terminal may report a NACK to the base station. These operations may cause a problem in a retransmission procedure of the SL data. As a first problem, a redundancy version (RV) included in SL DCI for retransmission may be different from an actual RV of SL data to be transmitted from the transmitting terminal. Accordingly, the RV of the SL data transmitted on a PSSCH may be different from the RV indicated by the SL DCI. As a second problem, it may be unclear whether the SL data transmission procedure according to the NACK occurring when the transmission of the SL data is not performed is counted as a retransmission procedure.

When a NACK for SL data is received, the base station may configure information elements (e.g., parameters) for retransmission of the SL data. For example, the base station may configure an RV for the retransmission of the SL data. The RV for retransmission may be configured differently from an RV for a previous transmission (e.g., initial transmission). In addition, the base station may increase the number of retransmissions of the SL data by one. However, when the NACK is caused due to SL data transmission not being performed, the transmitting terminal may not reconfigure the RV for transmission of the SL data, and may determine that the SL data transmission not performed is not included in the number of retransmissions. Accordingly, the following two schemes may be used to solve such problems.

Scheme 1: Parameter(s) for retransmission of SL data may be newly defined.

Scheme 2: A NACK generated when transmission of SL data is not performed may be configured to be distinct from a NACK due to a reception failure of SL data.

In exemplary embodiments below, a NACK occurring due to a reception failure of SL data may be referred to as 'type 1 NACK', and a NACK occurring when transmission of SL data is not performed may be referred to as 'type 2 NACK'.

Scheme 1: Methods of Configuring Parameter(s) for Retransmission of SL Data

When a type 2 NACK is received from the transmitting terminal, the base station may transmit SL DCI (hereinafter referred to as "retransmission SL DCI") to the transmitting terminal for retransmission of SL data associated with the type 2 NACK. The transmitting terminal may receive the retransmission SL DCI from the base station, and may identify information element(s) included in the retransmission SL DCI. In particular, the transmitting terminal may generate SCI including a previous RV of an RV included in the retransmission SL DCI, and may transmit the generated SCI to the receiving terminal. In addition, an NDI included in the retransmission SL DCI may be configured to indicate that the SL DCI is for a retransmission operation.

When an RV pattern is (RV #0→RV #1→RV #2→RV #3) and the retransmission SL DCI includes the RV #0, the transmitting terminal may transmit SCI including the RV #3, that is a previous RV of the RV #0, to the receiving terminal, and the transmitting terminal may determine the RV to be included in the SCI based on a mapping relationship defined in Table 3. The RV included in the SCI may be determined based on a circular buffer scheme. Additionally, the NDI included in the SCI may be configured to indicate that the SCI is for a retransmission operation.

TABLE 3

| RV included in retransmission SL DCI | | RV included in SCI |
|---|---|---|
| RV #0 | ↔ | RV #3 |
| RV #1 | ↔ | RV #0 |
| RV #2 | ↔ | RV #1 |
| RV #3 | ↔ | RV #2 |

The transmitting terminal may transmit SL data using the RV included in the SCI instead of the retransmission SL DCI. When the SCI is received from the transmitting terminal, the receiving terminal may perform a reception operation for the SL data by using the RV included in the SCI.

Meanwhile, the transmitting terminal may not be able to perform the transmission operation of the SL data twice. The two transmission operations that are not performed by the transmitting terminal may be continuous or discontinuous. In particular, the transmitting terminal may determine an RV to be included in SCI based on a mapping relationship defined in Table 4 below. For example, when the RV #0 is included in the retransmission SL DCI and the transmission operation of the SL data is not performed twice in succession, the transmitting terminal may determine the RV #2 as the RV to be included in the SCI. The NDI included in the retransmission SL DCI may be configured to indicate that the SL DCI is for a retransmission operation, and the NDI included in the SCI may be configured to indicate the SCI is for a retransmission operation.

TABLE 4

| RV included in retransmission SL DCI | | RV included in SCI |
|---|---|---|
| RV #0 | ↔ | RV #2 |
| RV #1 | ↔ | RV #3 |
| RV #2 | ↔ | RV #0 |
| RV #3 | ↔ | RV #1 |

Meanwhile, the RV included in the SCI may be configured differently from the RV included in the retransmission SL DCI in a specific situation. The RV may be classified into a type 1 RV that may be used to decode data (e.g., SL data) alone and a type 2 RV that can be used to decode data along with other RVs. The RV #0 and RV #2 may be type 1 RVs, and the RV #1 and RV #3 may be type 2 RVs. To ensure transmission of SL data having a type 1 RV, the RV included in the SCI may be configured differently from the RV included in the retransmission SL DCI.

When retransmission SL DCI associated with a type 2 NACK includes a type 2 RV, the transmitting terminal may transmit SCI including a previous RV (e.g., RV #0 or RV #2) of the type 2 RV (e.g., RV #1 or RV #3) included in the retransmission SL DCI. This operation may be applied to a case that the type 2 NACK is a NACK generated when initial transmission is not performed. When retransmission SL DCI associated with a type 2 NACK includes a type 1 RV, the transmitting terminal may transmit SCI including the type 1 RV (e.g., RV #0 or RV #2) indicated by the retransmission SL DCI.

Alternatively, when the SL data transmission operation is not performed continuously, when retransmission SL DCI associated with a first type 2 NACK is received, the transmitting terminal may transmit SCI including a previous RV of an RV included in the retransmission SL DCI, and when retransmission SL DCI associated with a type 2 NACK thereafter, the transmitting terminal may transmit SCI including the RV indicated by the corresponding retransmission SL DCI.

The SL data transmission operation according to the type 2 NACK may be counted as a retransmission.

Scheme 2: Method of Configuring a Type 2 NACK

Feedback of HARQ Response Based on Sequence Selection

The transmitting terminal may feedback a HARQ response to the base station based on sequence selection. When a HARQ response is ACK, the transmitting terminal may select a sequence mapped to the ACK from a preconfigured sequence set, and may transmit the selected sequence to the base station on a PUCCH. When a HARQ response is NACK (e.g., type 1 NACK or type 2 NACK), the transmitting terminal may select a sequence mapped to the NACK from a preconfigured sequence set, and may transmit the selected sequence to the base station on a PUCCH. The sequences mapped to ACK, type 1 NACK, and type 2 NACK may be configured as shown in Table 5 below.

TABLE 5

| Sequence #1 | Sequence #2 | Sequence #3 |
|---|---|---|
| ACK | Type 1 NACK | Type2 NACK |

The sequences defined in Table 5 may be orthogonal sequences or semi-orthogonal sequences. Alternatively, the sequences may be defined based on different cyclic shift values. The sequence #3 may be generated using a value between a cyclic shift value applied to the sequence #1 and a cyclic shift value applied to the sequence #2. Alternatively, the sequence #3 may be generated by applying a preconfigured cyclic shift value to the sequence #2. Alternatively, the sequence #3 may be generated by puncturing specific resource element (RE)(s) based on the sequence #2. To support the above-described operations, the base station may use one or a combination of two or more among higher layer signaling, MAC signaling, and PHY signaling to inform the cyclic shift value, puncturing pattern, and/or puncturing ratio to the terminal (e.g., transmitting terminal and/or receiving terminal). Alternatively, the cyclic shift value, puncturing pattern, and/or puncturing ratio may be predefined in the technical specification. The sequence #3 may be distinguished from the sequence #1 and the sequence #2. The sequence #3 may be configured according to various schemes so as to be distinguishable from the sequence #1 and the sequence #2.

Meanwhile, the feedback operation of the HARQ response may be performed in units of a code block group (CBG). The transmitting terminal may transmit HARQ responses for two CBGs to the base station on a PUCCH. In particular, sequences of the HARQ responses for two CBGs may be defined as shown in Table 6 below.

TABLE 6

| Sequence #1 | Sequence #2 | Sequence #3 | Sequence #4 | Sequence #5 |
|---|---|---|---|---|
| (A, A) | (A, N1) | (N1, A) | (N1, N1) | (N2, N2) |

The sequences defined in Table 6 may be orthogonal sequences or semi-orthogonal sequences. Alternatively, the sequences may be defined based on different cyclic shift values. In Table 6, A may refer to ACK, N1 may refer to a type 1 NACK, and N2 may refer to a type 2 NACK. Table 6 may be extended and applied to a case of indicating HARQ responses for three or more CBGs using one sequence. For example, sequences of the HARQ responses for three CBGs may be defined as shown in Table 7 below.

TABLE 7

| Sequence #1 | Sequence #2 | Sequence #3 |
|---|---|---|
| (A, A, A) | (A, A, N1) | (A, N1, A) |
| Sequence #4 | Sequence #5 | Sequence #6 |
| (N1, A, A) | (N1, A, N1) | (N1, N1, A) |
| Sequence #7 | Sequence #8 | Sequence #9 |
| (A, N1, N1) | (N1, N1, N1) | (N2, N2, N2) |

In another exemplary embodiment, sequences of HARQ responses for two CBGs may be defined as shown in Table 8 below. The sequences defined in Table 8 may be orthogonal sequences or semi-orthogonal sequences. Alternatively, the sequences may be defined based on different cyclic shift values.

TABLE 8

| Sequence #1 | Sequence #2 | Sequence #3 |
|---|---|---|
| (A, A) | (A, N1) | (A, N2) |
| Sequence #4 | Sequence #5 | Sequence #6 |
| (N1, A) | (N2, A) | (N1, N1) |
| Sequence #7 | Sequence #8 | Sequence #9 |
| (N2, N1) | (N1, N2) | (N2, N2) |

The transmitting terminal may select one sequence from among 9 sequences, and may transmit the selected sequence to the base station on a PUCCH (or PUSCH). The sequences (e.g., sequences #3, #5, #7, #8, and #9) indicating a type 2 NACK may be generated based on a modified value of cyclic shift values of the sequences (e.g., sequences #1, #2, #4, and #6) that do not indicate a type 2 NACK. Alternatively, the sequences indicating a type 2 NACK may be generated by puncturing specific RE(s) based on the sequences not indicating a type 2 NACK. The sequences indicating a type 2 NACK may be configured to be distinguished from the sequences not indicating a type 2 NACK. The sequences indicating a type 2 NACK may be configured according to various schemes so as to be detectable.

Feedback of HARQ Response Based on Codebook

Figure 8:
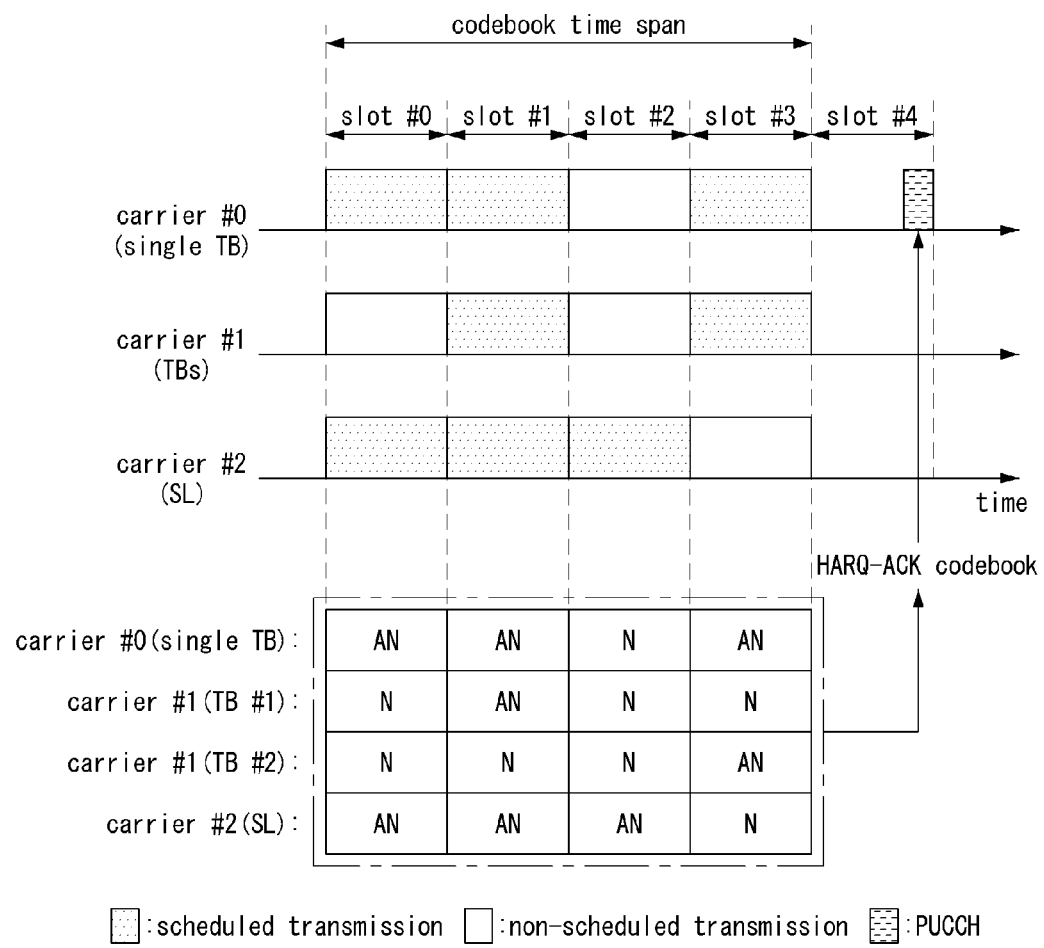
FIG. 8 is a sequence chart illustrating a first exemplary embodiment of a method of transmitting a HARQ-ACK codebook (e.g., a semi-static HARQ-ACK codebook).

FIG. 8 is a sequence chart illustrating a first exemplary embodiment of a method of transmitting a HARQ-ACK codebook (e.g., a semi-static HARQ-ACK codebook). As shown in FIG. 8, a transmission period (e.g., a time span of a codebook) may include 4 slots, and communication may be performed using three carriers in the transmission period. The carriers #0 and #1 may be used for downlink communication, and the carrier #2 may be used for sidelink communication. One TB (or one CBG) may be transmitted in each of the carriers #0 and #2, and two TBs (or two CBGs) may be transmitted in the carrier #1.

In the HARQ-ACK codebook, AN may refer to ACK or NACK, which is a result of decoding data, and N may refer to NACK. A scheduled transmission may be a transmission scheduled by semi-static signaling or dynamic signaling. A non-scheduled resource may be a resource that is not scheduled. In other words, a specific resource may not be used for transmission and reception of data, and in this case, the specific resource may be a non-scheduled resource. Since data (e.g., SL data) is not transmitted in a non-scheduled resource, the terminal may not receive the data in the non-scheduled resource, and thus may transmit a NACK. In other words, for configuration of the HARQ-ACK codebook, a NACK for a non-scheduled resource may be generated.

Alternatively, a non-scheduled resource may be a resource scheduled by scheduling information (e.g., scheduling information included in DCI or SCI) that the terminal does not receive. Particularly, since the scheduling information is not received, the terminal may not receive data corresponding thereto, and accordingly, may transmit a NACK. For example, when SL DCI is missing, the transmitting terminal may not know whether the SL DCI has been transmitted. Accordingly, the transmitting terminal may transmit a NACK to the base station. When the NACK is received from the transmitting terminal, the base station may determine that reception of the SL DCI or reception of the SL data has failed, and then perform a retransmission procedure of the SL data.

When a transmission unit of data (e.g., SL data) is a slot, a HARQ-ACK codebook including 16 HARQ response bits may be generated. The terminal (e.g., transmitting terminal) may transmit the HARQ-ACK codebook to the base station on a PUCCH allocated within the slot #4 of the carrier #0. For example, the transmitting terminal may transmit the SL data to the receiving terminal in the carrier #2, and may explicitly or implicitly receive HARQ response(s) (e.g., ACK or NACK) for the SL data from the receiving terminal. The transmitting terminal may generate a HARQ-ACK codebook including HARQ responses for one or more SL data units or a HARQ-ACK codebook including HARQ responses for one or more SL data units and HARQ responses for one or more DL data units (e.g., data transmitted in the carriers #0 and #1), and transmit the HARQ-ACK codebook to the base station.

A feedback timing (e.g., PUCCH timing) of a HARQ response for SL data may be configured by the base station. For example, the base station may transmit a higher layer message including information of one or more HARQ feedback timings to the terminal (e.g., transmitting terminal and/or receiving terminal). The HARQ feedback timing may indicate a time gap between a PSFCH and a PUCCH. The HARQ feedback timing may be referred to as 'sl-PSFCH-ToPUCCH', and 'SL-ScheduledConfig' including 'sl-PSFCH-ToPUCCH' may be included in a higher layer message transmitted from the base station to the terminal.

The terminal (e.g., transmitting terminal and/or receiving terminal) may receive the higher layer message from the base station, and may identify the information on one or more HARQ feedback timings included in the higher layer message. The base station may transmit SL DCI including a HARQ feedback timing indicator to the terminal (e.g., transmitting terminal and/or receiving terminal). The HARQ feedback timing indicator may be referred to as a PSFCH-to-HARQ feedback timing indicator. The HARQ feedback timing indicator may indicate a transmission time (e.g., PUCCH timing) of a HARQ response for SL data. For example, the HARQ feedback timing indicator may indicate a time gap (e.g., time offset) between a PSFCH and the PUCCH timing (e.g., HARQ feedback timing). The HARQ feedback timing indicator included in the SL DCI may indicate one HARQ feedback timing among the one or more HARQ feedback timings configured by the higher layer message.

The terminal (e.g., transmitting terminal and/or receiving terminal) may receive the SL DCI from the base station, and may identify information elements included in the SL DCI (e.g., scheduling information of SL data, HARQ feedback timing indicator, etc.). The transmitting terminal may transmit the SL data to the receiving terminal, and may receive a HARQ response for the SL data from the receiving terminal on a PSFCH. The SL data may be transmitted and received using a resource indicated by the SL DCI. The transmitting terminal may transmit a HARQ response for the SL data to the base station using a resource (e.g., PUCCH) indicated by the HARQ feedback timing indicator included in the SL DCI. The base station may receive the HARQ response for the SL data from the transmitting terminal in the resource (e.g., PUCCH) indicated by the HARQ feedback timing indicator included in the SL DCI.

Meanwhile, in the exemplary embodiment shown in FIG. 8, the DL HARQ response bit(s) and SL HARQ response bit(s) may be generated independently, the DL HARQ response bit(s) and the SL HARQ response bit(s) may be concatenated to generate one HARQ-ACK codebook, and the one HARQ-ACK codebook may be transmitted to the base station. The operation for concatenation between the DL HARQ response bit(s) and the SL HARQ response bit(s) may be performed according to various schemes. For example, the SL HARQ response bit(s) may be concatenated after the DL HARQ response bit(s).

When ACK is set to 1 and NACK is set to 0 in the exemplary embodiment shown in FIG. 8, the HARQ-ACK codebook may be configured as shown in Table 9 below. AN may refer to ACK or NACK.

TABLE 9

| 1 | 0 | 0 | 1 |
|---|---|---|---|
| 0 | 0 | 0 | 0 |
| 0 | 0 | 0 | 1 |
| 0 | 1 | 0 | 0 |

The SL HARQ responses may be (NACK, ACK, NACK, NACK). In particular, the first NACK and the third NACK may be NACKs for scheduled resources. The NACK generated when a SL data transmission operation is not performed in a scheduled resource may be a type 2 NACK (i.e., N2). When the first NACK is a type 2 NACK, the SL HARQ responses may be configured as shown in Table 10 below. The NACK (e.g., N1) for a scheduled resource may be distinguished from the NACK (e.g., N1) for a non-scheduled resource.

TABLE 10

| Carrier #2 (SL) | N2 (scheduled resource) | A (scheduled resource) | N1 (scheduled resource) | N1 (non-scheduled resource) |
|---|---|---|---|---|

To indicate N2 of Table 10, an indication bit may be configured as shown in Tables 11 to 14 below. In Table 11, an indication bit of N2 may be set to 1. In particular, the HARQ-ACK codebook may include 1 bit which is the indication bit for N2.

TABLE 11

| Carrier #2 (SL) | 1 | N/A | N/A | N/A |
|---|---|---|---|---|

In Table 12, an indication bit of N2 for a scheduled resource may be set to 1, and an indication bit of N1 for a scheduled resource may be set to 0. In particular, the HARQ-ACK codebook may include 2 bits (e.g., indication bit of N2+indication bit of N1). The HARQ-ACK codebook may not include an indication bit of ACK for a scheduled resource and an indication bit of NACK for a non-scheduled resource.

TABLE 12

| Carrier #2 (SL) | 1 | N/A | 0 | N/A |
|---|---|---|---|---|

In Table 13, an indication bit of N2 for a scheduled resource may be set to 1, an indication bit of N1 for a scheduled resource may be set to 0, and the indication bit of ACK for a scheduled resource may be set to 0. In particular, the HARQ-ACK codebook may include 3 bits (e.g., indication bit of N2+indication bit of N1+indication bit of ACK).

TABLE 13

| Carrier #2 (SL) | 1 | 0 | 0 | N/A |
|---|---|---|---|---|

In Table 14, an indication bit of N2 for a scheduled resource may be set to 1, and the indication bits for the remaining cases may be set to 0. In particular, the HARQ-ACK codebook may include 4 bits.

TABLE 14

| Carrier #2 (SL) | 1 | 0 | 0 | 0 |
|---|---|---|---|---|

The location of N2 for a plurality of scheduled resources may not be identified. To identify the location of N2, additional information may be transmitted.

Figure 9:
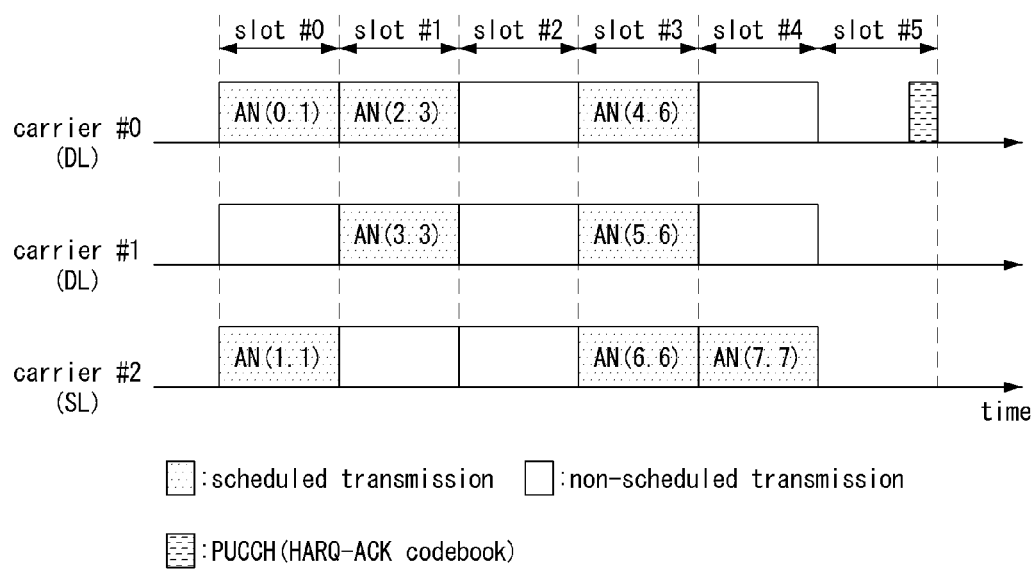
FIG. 9 is a sequence chart illustrating a second exemplary embodiment of a method of transmitting a HARQ-ACK codebook.

FIG. 9 is a sequence chart illustrating a second exemplary embodiment of a HARQ-ACK codebook transmission method. As shown in FIG. 9, communication may be performed using three carriers. The carriers #0 and #1 may be used for downlink communication, and the carrier #2 may be used for sidelink communication. One TB (or one CBG) may be transmitted in each of the carriers. A HARQ-ACK feedback operation may be performed based on a dynamic codebook. When a dynamic codebook is used, a HARQ response (e.g., NACK) for a non-scheduled resource may not be fed back. Accordingly, the number of HARQ response bits included in the dynamic codebook may be smaller than the number of HARQ response bits included in the semi-static codebook.

When a dynamic codebook is used, to identify for which data (e.g., PDSCH or PSSCH) a HARQ information bit is ACK/NACK, a counter downlink assignment index (cDAI) and/or a total downlink assignment index (tDAI) may be used. The cDAI and tDAI may be included in control information (e.g., DCI, SCI). In (x,y) shown in FIG. 9, x may be cDAI and y may be tDAI. The cDAI and tDAI may be configured in consideration of not only a downlink TB (e.g., PDSCH) but also a sidelink TB (e.g., PSSCH).

The index of the TB transmitted through the carrier #0 in the slot #0 may be 0, and the index of the TB transmitted through the carrier #2 in the slot #0 may be 1. The cDAI may be increased by 1. The tDAI may be configured in units of slots. The tDAI may be configured as the largest index among indices of TBs transmitted in the corresponding slot. In other words, the tDAI may be configured to be the maximum value of the cDAI in the corresponding slot. The tDAI may be set to 1 in the slot #0, and the tDAI may be set to 3 in the slot #1. The tDAI may be used to indicate the total number of downlink assignments from the first slot to the current slot in the transmission period. Sidelink assignments may be included in the total number of downlink assignments. Accordingly, SL HARQ response(s) may be multiplexed with DL HARQ response(s) in the HARQ-ACK codebook (e.g., dynamic codebook).

The HARQ-ACK codebook may include 8 HARQ response bits and may be transmitted on a PUCCH (or PUSCH). A counter sidelink assignment index (cSAI) and a total sidelink assignment index (tSAI) for the SL HARQ responses may be configured. The cSAI and tSAI may be operated independently of the cDAI and tDAI. Even in this case, SL HARQ response(s) may be multiplexed with DL HARQ response(s) within one codebook, and the one codebook may be transmitted to the base station via a PUCCH. The SL HARQ response(s) may be concatenated after the DL HARQ response(s) within the one codebook. Alternatively, the DL HARQ response(s) may be concatenated after the SL HARQ response(s) within the one codebook.

In Table 15 below, the SL HARQ responses may be (NACK, NACK, ACK). A dynamic codebook may not include HARQ response bits for a non-scheduled resource. Therefore, the size of the SL HARQ response may be 3 bits. The first NACK in the SL HARQ responses may be a type 1 NACK (i.e., N1). The second NACK in the SL HARQ responses may be a type 2 NACK (i.e., N2).

TABLE 15

| Carrier #2 (SL) | N1 | N2 | A |
|---|---|---|---|

To indicate N2 of Table 15, indication bit(s) may be configured as shown in Tables 16 to 18 below. In Table 16, the indication bit of N2 may be set to 1. In particular, the HARQ-ACK codebook may include 1 bit, which is the indication bit of N2.

TABLE 16

| Carrier #2 (SL) | N/A | 1 | N/A |
|---|---|---|---|

In Table 17, the indication bit of N2 for a scheduled resource may be set to 1, and the indication of N1 for a scheduled resource may be set to 0. In particular, the HARQ-ACK codebook may include 2 bits (e.g., indication bit of N2+indication bit of N1). The HARQ-ACK codebook may not include the indication bit of ACK for a scheduled resource.

TABLE 17

| Carrier #2 (SL) | 0 | 1 | N/A |
|---|---|---|---|

In Table 18, the indication bit of N2 for a scheduled resource may be set to 1, the indication bit of N1 for a scheduled resource may be set to 0, and the indication bit of ACK for a scheduled resource may be set to 0. In particular, the HARQ-ACK codebook may include 3 bits (e.g., indication bit of N2+indication bit of N1+indication bit of ACK).

TABLE 18

| Carrier #2 (SL) | 0 | 1 | 0 |
|---|---|---|---|

The location of N2 for a plurality of scheduled resources may not be identified. To identify the location of N2, additional information may be transmitted.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first terminal in a communication system, comprising:
    receiving downlink control information (DCI) for scheduling sidelink transmission from a base station, the DCI including a counter sidelink assignment index (cSAI);
    transmitting sidelink control information (SCI) including a redundancy version (RV) to a second terminal;
    transmitting first sidelink data to athe second terminal based on the DCI and the SCI;
    receiving a first sidelink (SL) hybrid automatic repeat request (HARQ) response for the first sidelink data from the second terminal through a physical sidelink feedback channel (PSFCH); and
    transmitting a HARQ-ACK codebook including the first SL HARQ response to the base station through a physical uplink control channel (PUCCH) at a feedback timing indicated by first information included in the DCI;
    wherein the cSAI is used for identifying the first sidelink data associated with the first SL HARQ response in the HARQ-ACK codebook;
    wherein, in response that the first sidelink data is retransmission data due to the first sidelink data not being received in the second terminal, the RV included in the SCI is different from an RV associated with the first sidelink data not being received in the second terminal; and
    wherein, in response that the first sidelink data is retransmission data due to the first sidelink data not being transmitted by the first terminal, the RV included in the SCI is identical to an RV associated with the first sidelink data not being transmitted to the first terminal.

2. The operation method according to claim 1, further comprising:
receiving a higher layer message including information indicating one or more feedback timings from the base station,
wherein the first information included in the DCI indicates one among the one or more feedback timings.

3. The operation method according to claim 1, wherein the feedback timing indicates a time gap between the PSFCH and the PUCCH.

4. The operation method according to claim 1, wherein the HARQ-ACK codebook further includes a downlink (DL) HARQ response for downlink data received from the base station.

5. The operation method according to claim 1, further comprising:
transmitting second sidelink data to the second terminal; and
receiving a second SL HARQ response for the second sidelink data from the second terminal,
wherein the HARQ-ACK codebook further includes the second SL HARQ response.

6. A first terminal in a communication system, comprising:
a processor; and
a memory configured to store at least one instruction executed by the processor,
wherein the at least one instruction is executed to:
receive downlink control information (DCI) for scheduling sidelink transmission from a base station, the DCI including a counter sidelink assignment index (cSAI);
transmit sidelink control information (SCI) including a redundancy version (RV) to a second terminal;
transmit first sidelink data to the second terminal based on the DCI and the SCI;
receive a first sidelink (SL) hybrid automatic repeat request (HARQ) response for the first sidelink data from the second terminal through a physical sidelink feedback channel (PSFCH); and
transmit a HARQ-ACK codebook including the first SL HARQ response to the base station through a physical uplink control channel (PUCCH) at a feedback timing indicated by first information included in the DCI,
wherein the cSAI is used for identifying the first sidelink data associated with the first SL HARQ response in the HARQ-ACK codebook;
wherein, in response that the first sidelink data is retransmission data due to the first sidelink data not being received in the second terminal, the RV included in the SCI is different from an RV associated with the first sidelink data not being received in the second terminal, and
wherein, in response that the first sidelink data is retransmission data due to the first sidelink data not being transmitted by the first terminal, the RV included in the SCI is identical to an RV associated with the first sidelink data not being transmitted to the first terminal.

7. The first terminal according to claim 6, wherein the at least one instruction is further executed to receive a higher layer message including information indicating one or more feedback timings from the base station, wherein the first information included in the DCI indicates one among the one or more feedback timings.

8. The first terminal according to claim 6, wherein the feedback timing indicates a time gap between the PSFCH and the PUCCH.

9. The first terminal according to claim 6, wherein the HARQ-ACK codebook further includes a downlink (DL) HARQ response for downlink data received from the base station.

10. The first terminal according to claim 6, wherein the at least one instruction is further executed to:
transmit second sidelink data to the second terminal; and
receive a second SL HARQ response for the second sidelink data from the second terminal,
wherein the HARQ-ACK codebook further includes the second SL HARQ response.

* * * * *